United States Patent [19]

Matz

[11] Patent Number: 4,526,957
[45] Date of Patent: Jul. 2, 1985

[54] COPOLYMERS OF MALEIC ANHYDRIDE AND ALKYLENE OXIDE TO INHIBIT THE PRECIPITATION AND DEPOSIT OF SCALE IN AQUEOUS SYSTEMS

[75] Inventor: Gary F. Matz, Pitcairn, Pa.

[73] Assignee: Calgon Corporation, Pittsburgh, Pa.

[21] Appl. No.: 469,324

[22] Filed: Feb. 24, 1983

[51] Int. Cl.$^3$ .............................................. C08G 67/04
[52] U.S. Cl. ................................. 528/366; 252/82; 252/180; 528/271
[58] Field of Search ............................ 528/366, 271

[56] References Cited

PUBLICATIONS

Fischer, R. F., "Polyesters from Epoxides and Anhydrides", Journal of Polymer Science, vol. XLIV, pp. 155–172, (1960).
Bacskai, R., "Structure of Poly(maleic Anhydride)", Journal of Polymer Science, vol. 14, pp. 1797–1807, (1976).
Wurm, H. et al., "The Reaction of Pyridine with Maleic Anhydride", Makromol Chem, 180, pp. 1481–1588, (1979).

Primary Examiner—Harold D. Anderson
Attorney, Agent, or Firm—M. C. Sudol; R. B. Olson; W. C. Mitchell

[57] ABSTRACT

The instant invention is directed to a copolymer of maleic anhydride and an alkylene oxide of the formula:

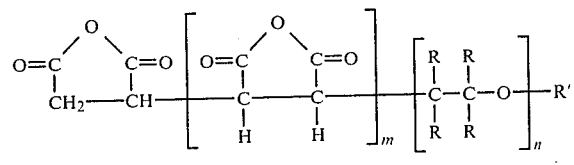

wherein
m is at least 4,
n is at least 1,
the ratio of m to n is at least 4:1, preferably 4:1 to 100:1,
R, which may be the same or different, is a hydrogen, halogen, alkyl derivative or phenyl derivative, and
R' is:

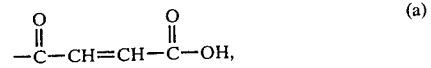

(a)

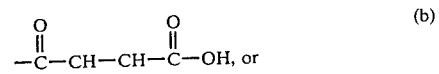

(b)

polymer     backbone

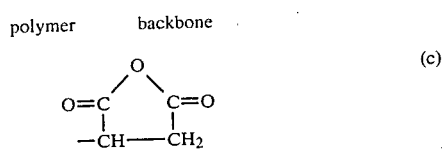
(c)

The instant invention is also directed to a process for the preparation of the copolymer and its use in inhibiting the precipitation and deposition of scale in an aqueous system.

10 Claims, No Drawings

COPOLYMERS OF MALEIC ANHYDRIDE AND ALKYLENE OXIDE TO INHIBIT THE PRECIPITATION AND DEPOSIT OF SCALE IN AQUEOUS SYSTEMS

BACKGROUND OF THE INVENTION

Copolymers of maleic anhydride and alkylene oxides wherein the maleic anhydride ring opens to form an ester linkage between the maleic anhydride and the alkylene oxide, thus forming a water-insoluble polyester, are known (Fischer, R. F., "Polyesters from Epoxides and Anhydrides", Journal of Polymer Science, Vol. XLIV, pages 155–172 (1960). Addition of certain tertiary amines during polyesterification is known to yield a perfectly linear polyester with no ether linkages that would result from propylene oxide homopolymerization. However, the copolymers of the instant invention wherein the maleic anhydride ring does not open to form the polyester are not known. It is also known that organic bases, such as pyridine, will affect charge transfer anionic polymerization of maleic anhydride (Wurm, H. et al, "The Reaction of Pyridine with Maleic Anhydride", Makromol. Chem. 180, 1581–1588 (1979). The key to the instant invention, however, it that when alkylene oxides are present during the pyridine-maleic anhydride reaction, the alkylene oxides will react through the usual ring opening sequence with the propagating anion forming a water-soluble copolymer of the starting materials. Termination of the alkoxy anion is accomplished through ester formation either with the backbone anhydride units or with previously unreacted maleic anhydride. The instant process, in addition to providing a novel polymer, provides a non-decarboxylating termination sequence for maleic anhydride copolymeriation. Decarboxylation lowers the scale inhibiting capability of a polymer.

The copolymers of the instant invention have been found useful as scale inhibitors. Generally scale deposits are incrustation coatings which may be formed from a wide variety of simple and complex inorganic salts which accumulate on the metallic surfaces of a water-carrying system through a number of different causes. While the method and compositions of the present invention have been found particularly useful in providing inhibition of calcium carbonate and calcium sulfate scales, inhibition of magnesium hydroxide, calcium fluoride, calcium phosphate and other common scales may also be obtained. Various industrial and commercial water-carrying systems are subject to scale formation problems. Scale is of particular concern in heat exchange systems employing water, such as boiler systems, and once-through and open recirculating water cooling systems.

The water employed in these systems ordinarily will contain a number of dissolved salts, the amount and nature of which will, of course, depend upon the source of the water employed. Thus, the water usually conains alkaline earth metal cations, primarily calcium and magnesium, and such anions as bicarbonate, carbonate, sulfate, silicate, phosphate, oxalate, fluoride, and so forth. Combination products of these anions and cations will precipitate from the water in which they are carried to form scale deposits when the concentration of the anion and cation comprising the combination or reaction product exceed the solubility of the reaction product. Thus, when the concentrations of calcium ion and carbonate and/or sulfate ion exceed the solubility of the calcium carbonate and/or calcium sulfate reaction product, a solid phase of calcium carbonate and/or calcium sulfate will form as a precipitate. Precipitation of the reaction product will continue until the solubility product concentrations of the constitutent ions are no longer exceeded.

Numerous factors may be responsible for producing a condition of supersaturation for a particular reaction product. Among such factors are changes in the pH of the water system, evaporation of the water phase, rate of heat transfer, amount of dissolved solids, and changes in the temperature or pressure of the system.

For boiler systems and similar heat exchange systems, the mechanism of scale formation is apparently one of crystallization of scale-forming salts from a solution which is locally supersaturated in the region adjacent the heating surface of the system. The thin viscous film of water in this region tends to become more concentrated than the remainder of the solution outside this region. As a result, the solubility of the scale-forming salt reaction product is first exceeded in this thin film, and crystallization of scale results directly on the heating surface.

In addition to this, a common source of scale in boiler systems is the breakdown of calcium bicarbonate to form calcium carbonate and magnesium hydroxide, water and carbon dioxide under the influence of heat. For open recirculating cooling water systems, in which a cooling tower, spray pond, evaporative condenser, and the like serve to dissipate heat by evaporation of water, the chief factor which promotes scale formation is concentration of solids dissolved in the water by repeated evaporation of portions of the water phase. Thus, even a water which is not scale forming on a once-through basis usually will become scale forming when concentrated two, four, or six times. The formation of scale deposits poses a serious problem in a number of regards. The different types of scale which are formed all possess a low degree of heat conductivity. Thus, a scale deposit is essentially an insulating layer imposed across the path of heat travel from whatever source to the water of the system. In the case of a boiler system, the retarded heat transfer causes a loss in boiler efficiency. Further, the heat insulating scale layer inhibits the normal coolant effect of the boiler water resulting in the boiler tube metal approaching the temperature of the fireside. This results in the tube metal reaching a sufficiently high temperature to cause tube burnout. In addition to this problem, scale formation facilitates corrosive processes, and a substantial scale deposit will interfere materially with fluid flow. Consequently, scale is an expensive problem in many industrial water systems, causing delays and shutdowns for cleaning and removal.

DESCRIPTION OF THE INVENTION

The instant invention is directed to a copolymer of maleic anhydride and an alkylene oxide of the formula:

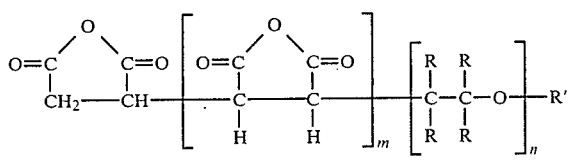

wherein
  m is at least 4,
  n is at least 1,
  the ratio of m to n is at least 4:1, preferably 4:1 to 100:1,
  R, which may be the same or different, is a hydrogen, halogen, alkyl derivative or phenyl derivative, and
  R' is:

$$\underset{}{-\overset{O}{\overset{\|}{C}}-CH=CH-\overset{O}{\overset{\|}{C}}-OH,} \quad (a)$$

$$\underset{\underset{polymer}{\frown}\,\underset{backbone}{\frown}}{-\overset{O}{\overset{\|}{C}}-CH-CH-\overset{O}{\overset{\|}{C}}-OH, \text{ or}} \quad (b)$$

$$\underset{-CH-\!\!-\!\!-CH_2}{O=C\overset{O}{\diagup\!\!\diagdown}C=O} \quad (c)$$

The instant invention is also directed to a method of inhibiting the precipitation and deposition of scale in an aqueous system comprising adding to the aqueous system 0.1 to 500 ppm of a copolymer of maleic anhydride and an alkylene oxide of the formula:

$$\underset{CH_2-\!\!-CH}{O=C\overset{O}{\diagup\!\!\diagdown}C=O}\left[\underset{\underset{H}{|}\;\underset{H}{|}}{O=C\overset{O}{\diagup\!\!\diagdown}C=O}\right]_m\left[\underset{R\;R}{\overset{R\;R}{\underset{|}{|}\;\underset{|}{|}}}C-C-O\right]_n R'$$

wherein
  m is at least 4,
  n is at least 1,
  the ratio of m to n is at least 4:1, preferably 4:1 to 100:1,
  R, which may be the same or different, is a hydrogen, halogen, alkyl derivative or phenyl derivative, and
  R' is:

$$\underset{}{-\overset{O}{\overset{\|}{C}}-CH=CH-\overset{O}{\overset{\|}{C}}-OH,} \quad (a)$$

$$\underset{\underset{polymer}{\frown}\,\underset{backbone}{\frown}}{-\overset{O}{\overset{\|}{C}}-CH-CH-\overset{O}{\overset{\|}{C}}-OH, \text{ or}} \quad (b)$$

$$\underset{-CH-\!\!-CH_2}{O=C\overset{O}{\diagup\!\!\diagdown}C=O} \quad (c)$$

The instant invention is also directed to a process for the preparation of a copolymer of maleic anhydride and an alkylene oxide of the formula:

$$\underset{CH_2-\!\!-CH}{O=C\overset{O}{\diagup\!\!\diagdown}C=O}\left[\underset{\underset{H}{|}\;\underset{H}{|}}{O=C\overset{O}{\diagup\!\!\diagdown}C=O}\right]_m\left[\underset{R\;R}{\overset{R\;R}{\underset{|}{|}\;\underset{|}{|}}}C-C-O\right]_n R'$$

wherein
  m is at least 4,
  n is at least 1,
  the ratio of m to n is at least 4:1, preferably 4:1 to 100:1,
  R, which may be the same or different, is a hydrogen, halogen, alkyl derivative or phenyl derivative, and
  R' is:

$$\underset{}{-\overset{O}{\overset{\|}{C}}-CH=CH-\overset{O}{\overset{\|}{C}}-OH,} \quad (a)$$

$$\underset{\underset{polymer}{\frown}\,\underset{backbone}{\frown}}{-\overset{O}{\overset{\|}{C}}-CH-CH-\overset{O}{\overset{\|}{C}}-OH, \text{ or}} \quad (b)$$

$$\underset{-CH-\!\!-CH_2}{O=C\overset{O}{\diagup\!\!\diagdown}C=O} \quad (c)$$

comprising reacting maleic anhydride and an alkylene oxide of the formula:

$$\underset{\underset{R}{|}\quad\underset{R}{|}}{R-C\overset{O}{\diagup\!\!\diagdown}C-R}$$

wherein
  R, which may be the same or different, is a hydrogen, halogen, alkyl derivative or phenyl derivative; in the presence of nitrogen or phosphorus-containing organic bases in polar aprotic organic solvents.

Any alkylene oxides may be used. The preferred alkylene oxides are of the formula:

$$\underset{\underset{R}{|}\quad\underset{R}{|}}{R-C\overset{O}{\diagup\!\!\diagdown}C-R}$$

wherein
  R, which may be the same or different, is a hydrogen, halogen, alkyl derivative or phenyl derivative, preferably hydrogen or a carbon chain of from 1 to 4 carbon atoms.

Specific examples of alkylene oxides which may be used include ethylene oxide, propylene oxide, isobutylene oxide, styrene oxide, trimethylene oxide, stilbene oxide and epichlorohydrin. The preferred alkylene oxides are propylene oxide and/or ethylene oxide.

The ratio of maleic anhydride to alkylene oxide in the copolymer should be at least 4 mols of maleic anhydride for each mol of alkylene oxide. The preferred ratio is from 4:1 to 100:1.

The molecular weight of the copolymer is not critical. The molecular weight is preferably 300 to 30,000, as determined by vapor phase osmometry using a dextrose standard.

The term "aqueous", as used herein, is intended to include water in any physical state and to include water in which is dissolved or dispersed any substance, for example, inorganic salts in brine or seawater.

The treatment concentration of the copolymer employed in the present invention to inhibit scale deposit and formation may be at levels ranging between 0.1 and 500 ppm by weight of the total solution of the water-carrying system being treated. Preferably, the concentration level will be from about 1.0 to 200 ppm.

The copolymer may be prepared by any of a variety of procedures, for example, in solution, suspension, bulk and emulsions.

The temperature is not critical. The reaction will generally occur between 5° and 250° C., preferably 25° to 70° C. It is generally impractical to run the reaction below room temperature because the reaction is too slow. Above a temperature of b 70° C., polymer degrades due to decarboxylation. The reaction, depending on the temperature, generally takes from 0.1 to 12 hours. Measuring the residual monomer will verify when the reaction is complete.

The solvent for the reaction should be a polar aprotic solvent. Generally, the higher the dielectric constant for the solvent, the quicker and more complete the reaction will be. Examples of solvents which may be used include acetone, acetonitrile, methyl ethyl ketone, N,N-dimethyl formamide, formamide, and dimethyl sulfoxide. The preferred solvents are acetone and acetonitrile.

Nitrogen or phosphorus-containing organic base initiators should be used to prepare the copolymer. Examples include pyridine, vinyl pyridine, dipryridyl, imidazole and triphenyl phoshine. The preferred initiator is pyridine.

The copolymer produced by the process of the instant invention may be recovered by precipitating the copolymer out of the solution with a non-solvent, such as chloroform.

EXAMPLES

Example 1

The following reagents were mixed at 37° C. and allowed to react:

10 g maleic anhydride
10 ml propylene oxide
16 g acetone
2 ml pyridine

After 3 hours of magnetic stirring, the brown solution was added to 500 ml of chloroform, causing a precipitate to form. 60 MHz proton NMR of the precipitate contained the following information:

A 1:1 comonomer feed was used; however, NMR peak intensity integration indicated a 6:1 incorporation. Broad peak centered around 1.2 ppm assigned to methyl and methylene protons of the opened propylene oxide. Broad peak from 2-5 ppm assigned to the methine protons of the maleic anhydride repeat units. Broad peak centered around 4.7 ppm assigned to the methoxy protons of the opened propylene oxide. Narrow singlet at 5.85 ppm due to residual maleic anhydride. Series of multiplet peaks from 7.0-7.7 ppm due to pyridine. Broad peak at 6.1 ppm due to polymer unsaturation. Integrated signal intensities gave the following polymer molar composition: 80% maleic anhydride repeat units, 14% opened propylene oxide, and 6% unsaturated maleic anhydride. These assignments were verified through infrared analysis.

EXAMPLE 2

The copolymer was prepared as in Example 1, except 5 ml propylene oxide were used, instead of 10 ml. NMR peak intensity indicated that the polymer had a 6:1 maleic anhydride/propylene oxide composition. Number average molecular weight, as determined by vapor phase osmometry, using a dextrose standard, was 429.

EXAMPLE 3

The copolymer was prepared as in Example 1, except 1 ml propylene oxide was used, instead of 10 ml. NMR peak intensity integration showed the composition was 10:1.

EXAMPLE 4

The polymer of Comparison Example 4 of Table I was prepared from 25 parts of maleic anhydride, dissolved in 50 parts of toluene by heating to 70° C. and 7.15 parts of a 70 percent paste of benzoyl peroxide in dimethyl phthalate (=5 parts benzoxyl peroxide), dissolved in 25 parts toluene, added to the maleic anhydride solution over a period of 15 minutes. The solution was then heated to 90° C. and maintained at this temperature for 5 hours. During this time, polymer was precipitated from the solution as a dark-colored tar.

After the 5-hour reaction time, the solution was cooled to 30° C. and the toluene removed by decanting. The polymer was dissolved in 5 parts methyl ethyl ketone by heating to 70° C. This solution was poured into 100 parts of stirred toluene in order to precipitate the polymer which was then filtered off and dried under vacuum at room temperature.

Molecular weight, by vapor phase osmometry, using a dextrose standard, was 840.

EXAMPLE 5

The polymer of Comparison Example 5 of Table I is a homopolymer of polymaleic adhydride, Belclene, manufactured by Ciba Geigy, having a molecular weight of about 4000, as determined by low angle laser light scattering.

Scale Inhibition

Calcium carbonate inhibition of the polymers of Examples 1 through 5 was tested using 0.001 molar $CaCO_3$ with the specified levels of copolymer at 60° C. for 24 hours. The percent inhibition was determined by measuring $Ca^{++}$ concentration in solution before and after the 24-hour period. The results are summarized in Table. I.

Calcium sulfate inhibition of the polymers of Examples 1 through 5 was tested using 0.05 molar $CaSO_4$ with the specified levels of copolymer at 60° C. for 24 hours. The percent inhibition was determined by measuring $Ca^{++}$ concentration in solution before and after the 24-hour period. The results are summarized in Table I.

TABLE I

| | | Percent Inhibition | | | | | | |
|---|---|---|---|---|---|---|---|---|
| Ex- | | Calcium Carbonate (ppm) | | | Calcium Sulfate (ppm) | | | |
| am-ple | Polymer | 0.5 | 1.0 | 10 | 2.5 | 3.0 | 5.0 | 20 | 30 |
| 1 | 4:1 Copolymer maleic | 59 | 100 | 100 | 33 | 60 | 87 | 100 | 97 |

TABLE I-continued

| Example | Polymer | Percent Inhibition | | | | | | |
|---|---|---|---|---|---|---|---|---|
| | | Calcium Carbonate (ppm) | | | Calcium Sulfate (ppm) | | | |
| | | 0.5 | 1.0 | 10 | 2.5 | 3.0 | 5.0 | 20 | 30 |
| | anhydride/ propylene oxide | | | | | | | | |
| 2 | 6:1 Copolymer maleic anhydride/ propylene oxide | 100 | 100 | 99 | 27 | 50 | 60 | 100 | 100 |
| 3 | 10:1 Copolymer maleic anhydride/ propylene oxide | 72 | 93 | 97 | 25 | 67 | 57 | 100 | 100 |
| 4* | Homopolymer PMA | 72 | 91 | 100 | 33 | 83 | 93 | 83 | 70 |
| 5* | Homopolymer PMA | 41 | 84 | 100 | 13 | 55 | 60 | 27 | 20 |

*Comparison

What is claimed is:

1. A copolymer of maleic anhydride and an alkylene oxide of the formula:

[structure shown]

wherein
   m is at least 4,
   n is at least 1,
   the ratio of m to n is at least 4:1,
   R, which is the same or different, is a hydrogen, halogen, alkyl or phenyl, and
   R' is:

$$-\overset{O}{\underset{\|}{C}}-CH=CH-\overset{O}{\underset{\|}{C}}-OH \quad \text{or} \quad (a)$$

$$\begin{matrix} O \\ / \quad \backslash \\ O=C \quad\quad C=O \\ | \quad\quad\quad | \\ -CH\text{---}CH_2 \end{matrix} \quad (b)$$

2. The copolymer of claim 1, wherein R is a hydrogen or a carbon chain of from 1 to 4 carbons.

3. The copolymer of claim 1, wherein the ratio of m to n is from 4:1 to 100:1.

4. The copolymer of claim 1, having a molecular weight of 300 to 30,000, as determined by vapor phase osmometry using a dextrose standard.

5. A process for the preparation of copolymer of maleic anhydride and an alkylene oxide of the formula:

[structure shown]

wherein
   m is at least 4,
   n is at least 1,
   the ratio of m to n is at least 4:1,
   R, which is the same or different, is a hydrogen, halogen, alkyl or phenyl, and
   R' is:

$$-\overset{O}{\underset{\|}{C}}-CH=CH-\overset{O}{\underset{\|}{C}}-OH \quad \text{or} \quad (a)$$

$$\begin{matrix} O \\ / \quad \backslash \\ O=C \quad\quad C=O \\ | \quad\quad\quad | \\ -CH\text{---}CH_2 \end{matrix} \quad (b)$$

comprising reacting maleic anhydride and an alkylene oxide of the formula:

$$\begin{matrix} O \\ / \quad \backslash \\ R-C\text{-----}C-R \\ | \quad\quad\quad | \\ R \quad\quad\quad R \end{matrix}$$

wherein
   R, which is the same or different, is a hydrogen, halogen, alkyl derivative or phenyl derivative;
   in contact with at least one nitrogen or phosphorus-containing organic base in at least one polar aprotic organic solvent.

6. The process of claim 5, wherein said alkylene oxide is selected from the group consisting of ethylene oxide, propylene oxide and mixtures thereof.

7. The process of claim 5, wherein said nitrogen-containing organic base is pyridine.

8. The process of claim 5, wherein said polar aprotic organic solvent is acetone.

9. The process of claim 5, further comprising precipitating out the copolymer with a non-solvent.

10. The process of claim 9, wherein said non-solvent is chloroform.

* * * * *